(12) United States Patent
Hsieh et al.

(10) Patent No.: US 7,234,959 B2
(45) Date of Patent: Jun. 26, 2007

(54) DISPLAY DEVICE WITH A JACK

(75) Inventors: Kuan-Hong Hsieh, Guangdong (CN); Te-Hsu Wang, Guangdong (CN)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/163,721

(22) Filed: Oct. 28, 2005

(65) Prior Publication Data

US 2006/0148307 A1    Jul. 6, 2006

(30) Foreign Application Priority Data

Dec. 30, 2004    (CN) ........................ 2004 2 0103613

(51) Int. Cl.
*H01R 13/64* (2006.01)

(52) U.S. Cl. ..................................................... 439/374

(58) Field of Classification Search ................ 439/374, 439/380, 381, 668, 669
See application file for complete search history.

(56) References Cited

U.S. PATENT DOCUMENTS 5,650,581 A * 7/1997 Sigrist ......................... 84/291

* cited by examiner

*Primary Examiner*—Javaid H. Nasri
(74) *Attorney, Agent, or Firm*—Winston Hsu

(57) ABSTRACT

A display device with a jack is disclosed. The display device (1) includes a display screen (10), a display bezel (40), a jack (20), a guide groove (21), and a guide wall (22). The guide groove and the guide wall are for guiding a user to insert a plug into the jack without mistake. The guide groove is position on one side of the jack, whereas, the guide wall is on an opposite side of the jack from the guide groove. The guide groove and the guide wall cooperate together to prevent deflection when a plug is inserted into the jack.

11 Claims, 4 Drawing Sheets

DISPLAY DEVICE WITH A JACK

FIELD OF THE INVENTION

The present invention relates to a display device, and particularly to a display device with a jack.

DESCRIPTION OF RELATED ART

In most display devices having jacks, suck as earphone jacks or power supply jacks, the jack is positioned on the underside or back side of the panel of the display device for aesthetic reasons. However, the positioning of the jack may cause inconvenience for a user when inserting a plug such as an earphone plug into the jack. For example, before inserting the plug into the jack, the user must determine the location of the jack on the display device. Furthermore, the disposition of the display may be such that visually determining the location of the jack may not be possible and must be done by touch. Therefore, what is needed is a display device with a jack having a means to tactilely guide the user to easily locate the jack and insert the plug.

SUMMARY OF INVENTION

A display device with a jack having a means to guide insertion of a plug is provided. The display device includes a display screen, a display bezel, a jack, a guide groove, and a guide wall. In a preferred embodiment, the jack is an earphone jack. The jack is provided with an appropriate depth so that a plug can be inserted into it. The guide groove is positioned on one side of the jack, whereas the guide wall is positioned on an opposite side of the jack. Further, the guide wall is a protuberant, generally U-shaped structure that together with the guide groove prevents deflection when the plug is inserted into the jack.

Further features of the invention will be described or will become apparent in the course of the following detailed description when read in conjunction with the attached drawings, in which:

DETAILED DESCRIPTION

Figure 1:
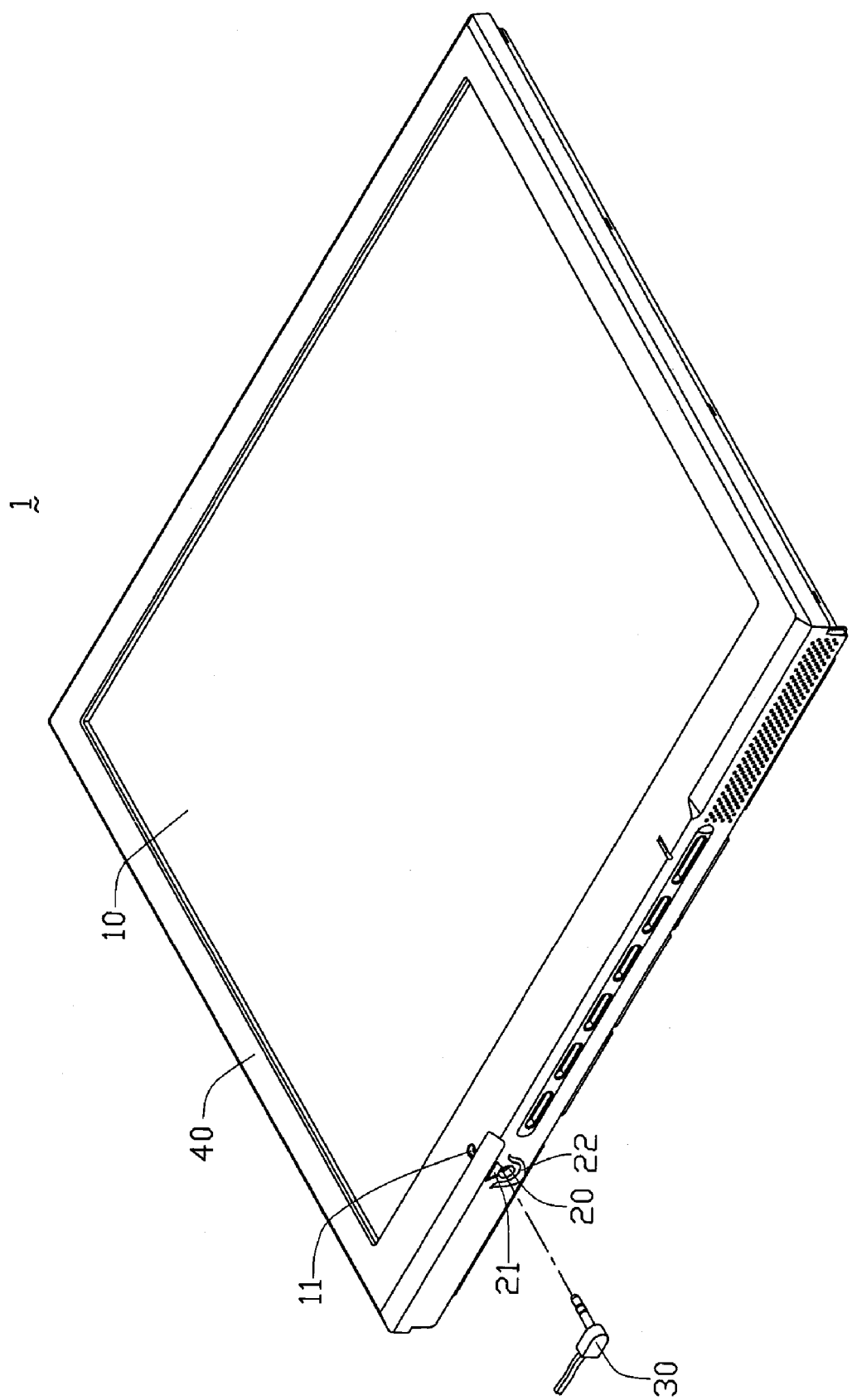
FIG. 1 is a schematic, isometric view of a display device having an earphone jack with a guide in accordance with a preferred embodiment of the present invention, together with an earphone plug ready to be inserted into the earphone jack.
Figure 2:
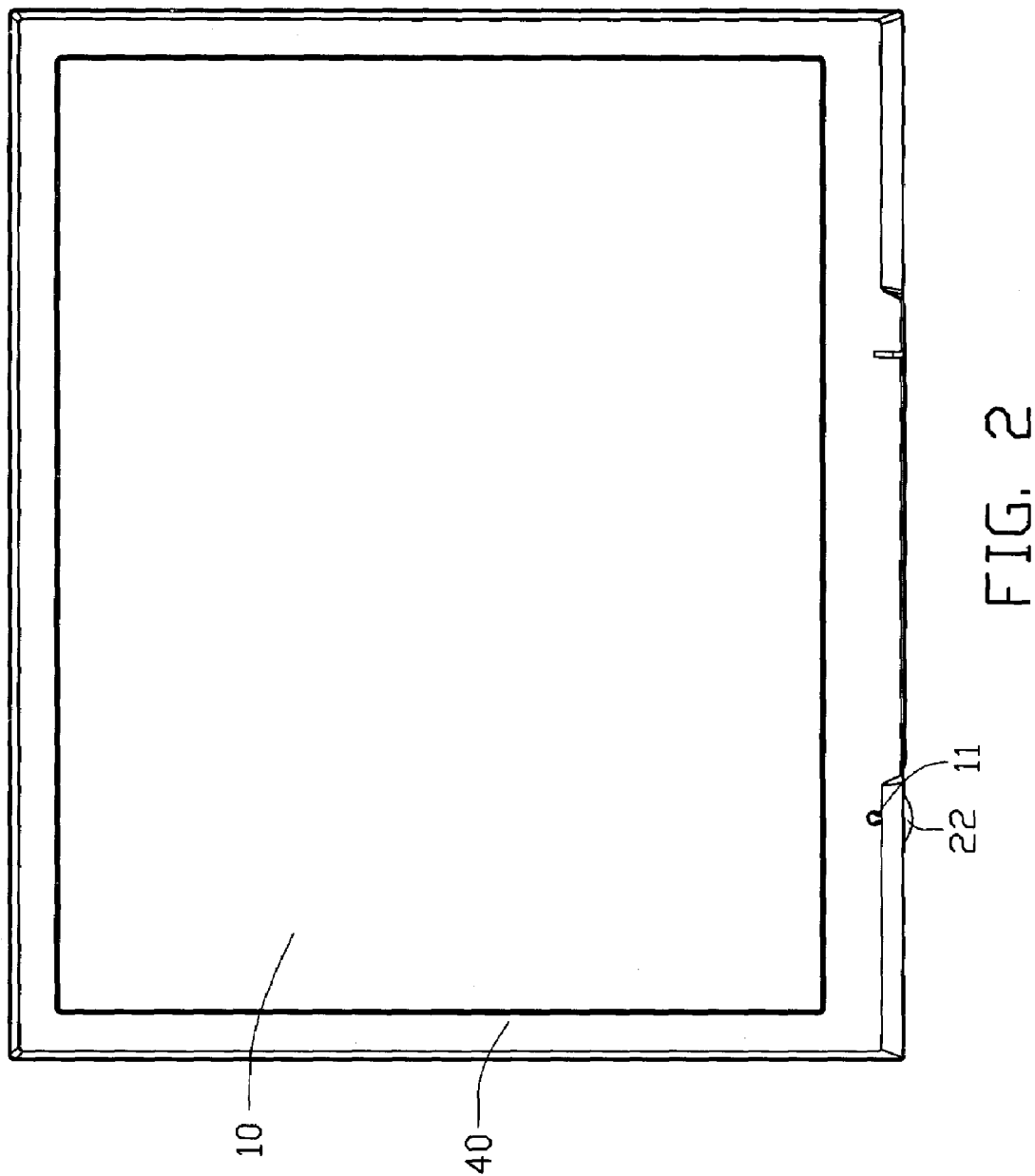
FIG. 2 is a front view of the display device of FIG. 1.

Referring to FIGS. 1 and 2, for simplicity, a display device having an earphone jack with a guide in accordance with a preferred embodiment of the present invention is shown. However, it should be noted that the jack with the guide is not limited to the application in guiding insertion of an earphone plug, indeed, the jack with the guide can be used in any other suitable applications, such as guiding insertion of a power supply plug, a microphone plug, and so on. In the preferred embodiment, the display device 1 provides a display screen 10 and a display bezel 40. The display bezel 40 provides a jack 20, a guide groove 21, and a guide wall 22 thereof. The jack 20 is positioned at an underside of the display bezel 40. The jack 20 is provided with an appropriate depth, so that an earphone plug 30 can be inserted into it and thereby electrically connect with circuitry inside the display device 1. The guide groove 21 is used for guiding the earphone plug 30 to be inserted into the jack 20. The guide groove 21 is positioned on one side of the jack 20 that is nearest to typical access by a user, whereas the guide wall 22 is positioned on an opposite side of the jack 20. The guide wall 22 is protuberant relative to the display bezel 40, the guide groove 21 and the jack 20. Furthermore, the guide wall 22 is a substantially U-shaped structure, which generally encloses the jack 20 on three sides. In addition, in order to visually indicate the position of the jack 20, the display bezel 40 is provided with an indicator 11, thus avoiding the need to search for the jack 20.

Figure 3:
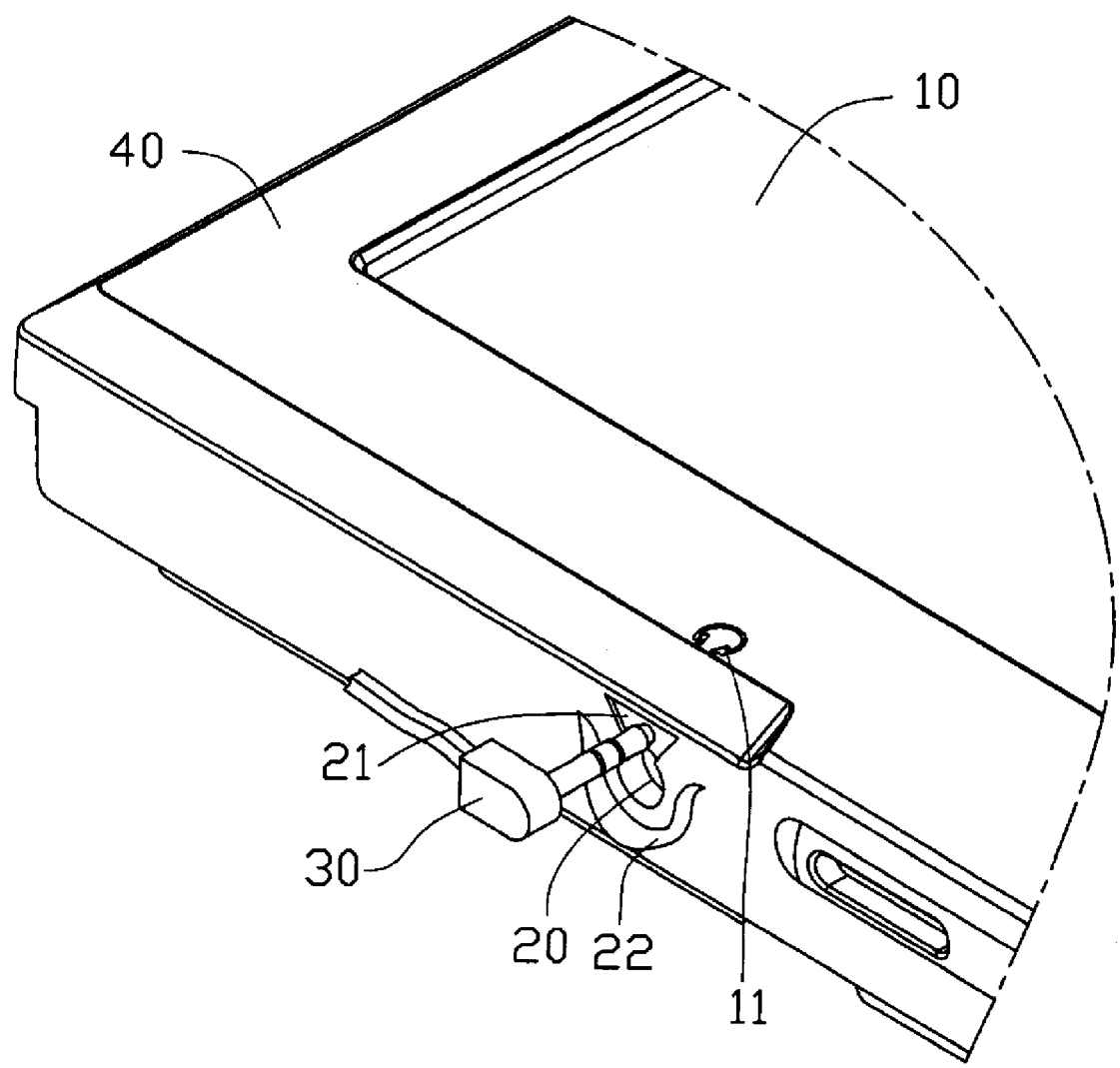
FIG. 3 is essentially an enlarged view of part of FIG. 1, showing the earphone plug located at a guide groove of the earphone jack.
Figure 4:
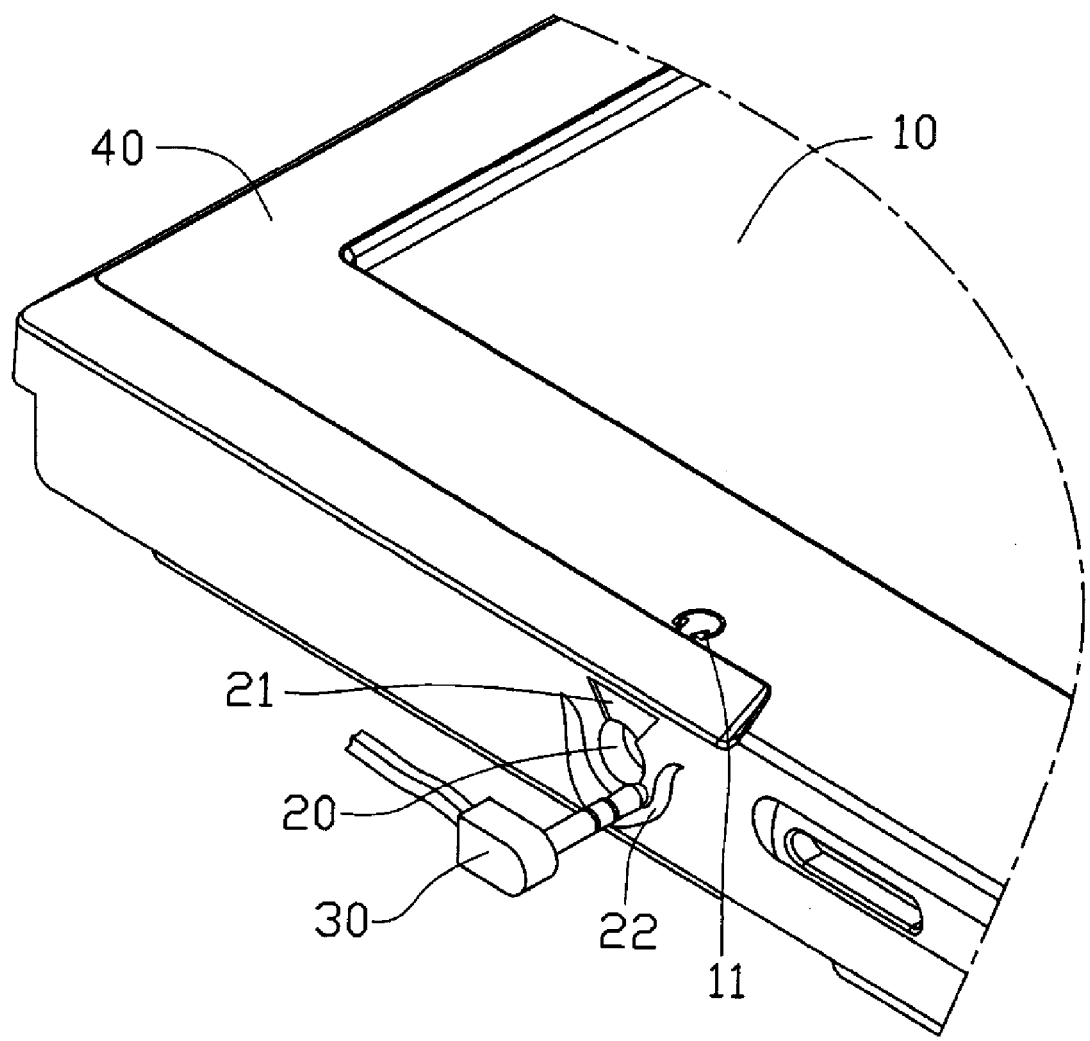
FIG. 4 is similar to FIG. 3, but showing the earphone plug located at a guide wall of the earphone jack.

FIGS. 3 and 4 respectively show the earphone plug 30 located at the guide groove 21 and the guide wall 22. As described above, the indicator 11 visually indicates the position of the jack 20, and the guide wall 22 is protuberant and U-shaped so as to prevent the earphone plug 30 being deflected from the jack 20. Therefore, a user can identify the position of the jack 20 quickly based on the indicator 11. Then when the earphone plug 30 comes into contact with the general area of the jack 20, the user is guided either by the guide wall 22 or the guide groove 21 to adjust the position of the earphone plug 30 for easy insertion into the jack 20. If contact is made in the guide groove 21, the user will know he/she should move the earphone plug 30 away from himself/herself and insert it into the jack 20. Alternatively, if contact is made with the guide wall 22, the user will know he/she should move the earphone plug 30 toward himself/herself and then insert it into the jack 20.

Through the use of the indicator 11, the user can know the approximate position of the jack 20 before attempting to insert the earphone plug 30 into the jack 20. Thereupon the user can correctly and easily insert the earphone plug 30 into the jack 20 with the aid of the guide groove 21 or/and the guide wall 22.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A display device comprising:
   a display screen;
   a display bezel;
   a jack, positioned on the display bezel thereof, for receiving a complementary plug;
   a guide groove positioned adjacent the jack for guiding the complementary plug to the jack; and
   a guide wall positioned adjacent the jack opposite to the guide groove, protuberant relative to the display bezel.

2. The display device of claim 1, wherein the guide wall is generally U-shaped.

3. The display device of claim 1, wherein the guide groove is positioned adjacent the jack at a side thereof nearest to typical access by the user.

4. The display device of claim 1, wherein the guide wall is positioned adjacent the jack at a side thereof furthest from typical access by the user.

5. The display device of claim 1, further comprising an indicator, for the user to visually determine the location of the jack.

6. A display device comprising:

a display screen;

a display bezel;

a jack, positioned on the display bezel thereof, for receiving a complementary plug; and a guide wall positioned adjacent the jack, protuberant relative to the display bezel, for helping a user to locate and use the jack.

7. The display device of claim 6, further comprising a guide groove positioned adjacent the jack opposite to the guide wall for guiding the complementary plug to the jack.

8. The display device of claim 7, wherein the guide groove is positioned adjacent the jack at a side thereof nearest to typical access by the user.

9. The display device of claim 8, wherein the guide wall is generally U-shaped.

10. The display device of claim 6, wherein the guide wall is positioned adjacent the jack at a side thereof furthest from typical access by the user.

11. The display device of claim 6, further comprising an indicator, for the user to visually determine the location of the jack.

* * * * *